Figure 1:
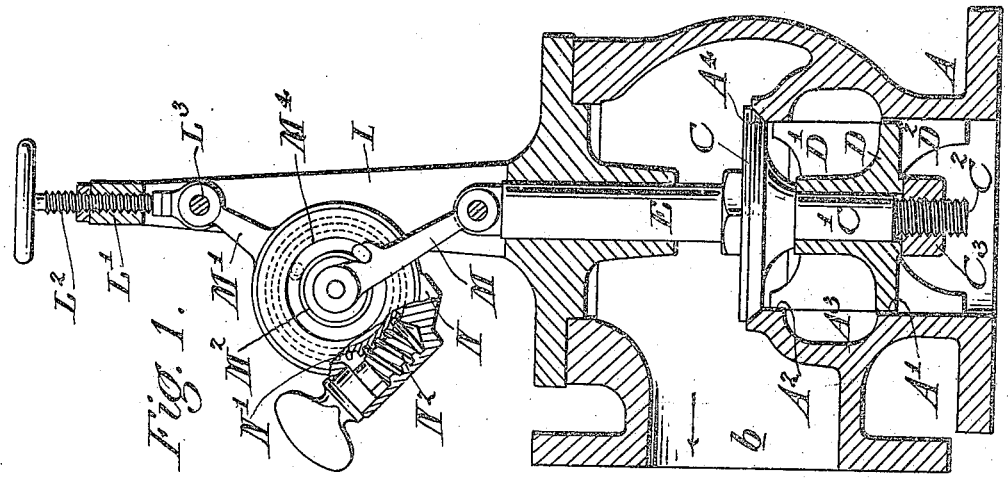

L. SCHUTTE, DEC'D.
GUARANTEE TRUST & SAFE DEPOSIT CO. & MARY D. SCHUTTE, EXECUTORS.
SAFETY VALVE.
APPLICATION FILED JAN. 18, 1905.

961,735.

Patented June 14, 1910.
2 SHEETS—SHEET 1.

WITNESSES:

INVENTOR:
Louis Schutte
BY
Francis I Chambers
his ATTORNEY.

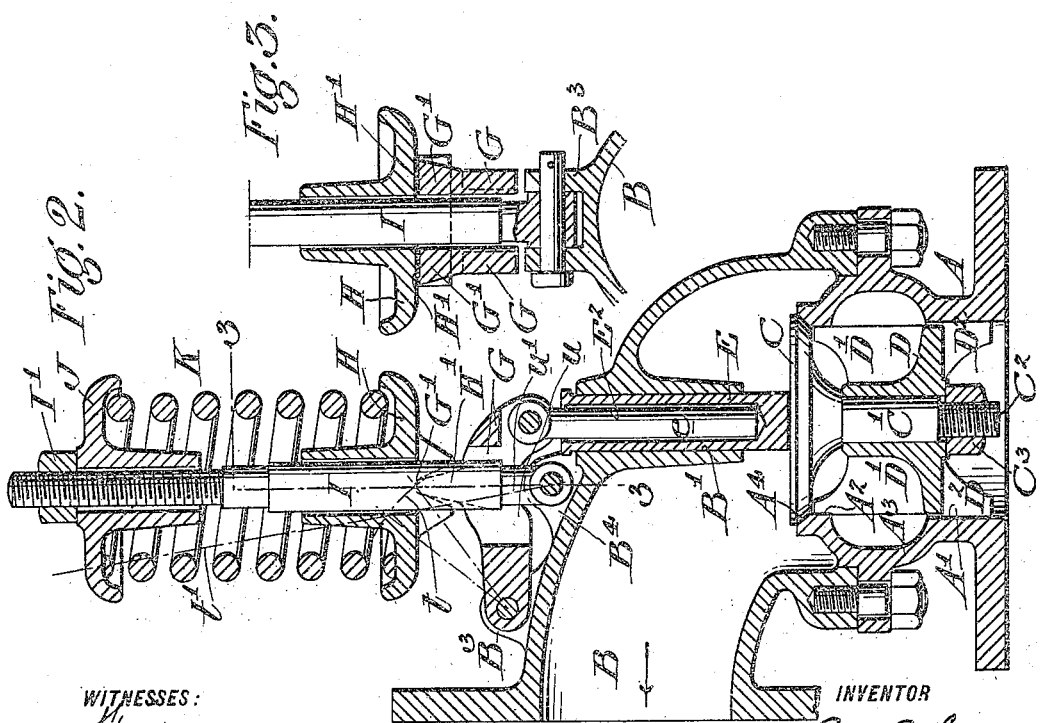

UNITED STATES PATENT OFFICE.

LOUIS SCHUTTE, OF PHILADELPHIA, PENNSYLVANIA; GUARANTEE TRUST & SAFE DEPOSIT CO. AND MARY D. SCHUTTE, EXECUTORS OF SAID LOUIS SCHUTTE, DECEASED, ASSIGNORS TO SCHUTTE AND KOERTING COMPANY, OF PHILADELPHIA, PENNSYLVANIA, A CORPORATION OF PENNSYLVANIA.

SAFETY-VALVE.

961,735.  Specification of Letters Patent.  Patented June 14, 1910.

Application filed January 18, 1905. Serial No. 241,623.

*To all whom it may concern:*

Be it known that I, LOUIS SCHUTTE, a citizen of the United States of America, residing in the city and county of Philadelphia, in the State of Pennsylvania, have invented a certain new and useful Improvement in Safety-Valves, of which the following is a true and exact description, reference being had to the accompanying drawings, which form a part thereof.

My invention relates to valves of the general character known as safety valves, that is to say, valves which are normally closed, but are adapted to open under a determined pressure.

The object of my invention is to provide a valve of this character which shall be free from the tendency to chatter, or, at least, more free from this tendency than is generally the case; also I have in view a general improvement in the mode of construction and operation of these valves.

The nature of my improvements will be best understood as described in connection with the drawings in which they are illustrated in various modifications, and in which—

Figure 1 is a sectional elevation of a valve provided with my improvements. Fig. 2 is a similar sectional elevation of a valve showing a modified device for holding the valve to its seat, and Fig. 3, is a section on the line 3—3 of Fig. 2.

A, Figs. 1 and 2, indicates the entrance passage leading into the valve casing and having at one end, the upper one, as shown, a valve seat indicated at $A^4$, below which is a cylindrical portion $A^2$, having the same diameter as the inner edge of the valve seat and having formed below it an annular chamber $A^3$, of considerably greater diameter, while below this chamber is formed a cylindrical passage $A'$, of slightly greater diameter than the cylindrical portion $A^2$.

In Fig. 1 $b$ and in Fig. 2, B indicates the outlet passage of the valve casing in which is formed the cylindrical passage $B'$ for the pin E which holds the valve to its seat.

C, is the valve, adapted to seat itself, as shown, on the valve seat $A^4$, and having a depending stud $C'$, with threaded bolt $C^2$, at its end on which screws a nut $C^3$, which holds in position on the stud $C'$, a disk D, so placed as to fit into the cylindrical portion $A'$, when the valve is closed and to raise itself into the chamber $A^3$, when the valve is opened, the disk making a leaky fit with the chamber $A'$.

$D'$, $D'$, $D^2$, $D^2$, are guide flanges connected with disk D, as shown.

E, is the pin, longitudinally movable in the guideway $B'$, and resting on the guideway of the upper face of the valve C, as shown.

In the construction of Fig. 1, arms or links such as are indicated at L, extend up from the valve casing and support an internally threaded head $L'$, in which screws a threaded rod or abutment $L^2$ supporting at its end a pivot bearing $L^3$. To this pivot bearing $L^3$, and the top of the pin $M^3$, and to the top of levers $M'$, pivoted at $M^2$, and connected with a spring $M^4$, the force of which is exerted to draw the levers or links M, or $M'$, into parallel position or alinement and of course to push down the pin E. As shown, the spring is incased in a box N, and its tension regulated by a worm $N^2$, acting on a worm wheel $N'$, which of course is connected with one end of the spring so as to regulate its tension. It will be readily seen that the spring mechanism and the links M and $M'$, form a toggle, and act with increasing power as the links approach a parallelism.

In normal operation, the pressure fluid entering through the portion A, of the casing leaking around the disk D, acts with its full pressure on the under side of valve C, the valve being held to its seat through the regulated pressure system indicated. When the pressure becomes sufficient to overcome the force tending to hold the valve closed, the valve C rises slowly from its seat giving free escape to the fluid situated between the valve and the disk D, whereupon the fluid in the rear of the disk D, acting on its larger area, raises it and the valve C with accelerated force until the disk D clears the cylindrical passage $A'$, and permits the free escape of the fluid around it through the chamber $A^3$ and the now widely open valve C. As described the means used to hold the valve to its seat are arranged so as to act with decreasing force when the valve recedes from its seat. In consequence the valve will not close until the pressure has fallen below the point at which the valve has opened.

In the modifications shown in Figs. 2 and 3, the pin E is recessed as shown at E² and the second pin e fitted into this recess, resting against the top thereof and secured at top to the free end of the forked lever indicated at G, and pivoted to lugs B³, of the valve casing, as shown. This forked lever has on each arm an upwardly extending fulcrum lug, indicated at G'. Pivoted to lugs B⁴, of the valve casing and passing up between the arms of the lever G is a rod I, having a threaded upper end on which screws a nut I', which nut holds in place a spring thimble indicated at J, another spring thimble indicated at H, is fitted over the rod I, and formed with notched lugs H', H', into which the lugs G' pass, as shown, the thimble being supported by the lugs. K, is a spring situated between the thimbles as shown. It will readily be seen that the spring K, in the construction of Figs. 2 and 3, serves exactly the same purpose as the spring M⁴ of Fig. 1, also that whenever the valve C is raised from its seat the lugs of the lever G will move in a circular path, indicated at t, with the result that the rod I will be tilted over to an angular position as indicated at t'. Owing to this tilting of the rod the spring which normally acts through the lever arm, such as is indicated at u, will act through a decreasing lever arm such as is indicated at u', the effect being of course the same as with the construction of Fig. 1.

Having now described my invention, what I claim as new and desire to secure by Letters Patent is—

1. A safety valve having in combination, a valve seat having a cylindrical passage situated below it and a laterally expanded chamber between the seat and cylindrical passage, a valve adapted to seat itself on the valve seat, a cylindrical disk dependent from said valve and adapted to make a leaky fit in the cylindrical passage when the valve is seated and to be lifted above and clear of said passage when the valve is open whereby the force tending to hold the valve open increases as the valve moves off its seat and an external loading device for holding the valve closed acting with diminishing force as the valve lifts off its seat.

2. In a safety valve construction, a valve proper, and pressure regulating means for resisting the opening of said valve, said means including an abutment and a pair of links one pivoted at one end to the valve and the other pivoted at one end to said abutment, said links having their adjacent ends pivoted together and their pivotal connections to the valve and abutment separated by a distance substantially greater than the effective length of either link and in a line substantially parallel to the line of movement of the valve and resilient means acting on said links and tending to draw the links into alinement whereby the links act as a toggle tending to hold the valve to its seat.

3. In a safety valve construction, a valve proper, and pressure regulating means for resisting the opening of said valve, said means including an abutment and a pair of links one pivoted at one end to the valve and the other pivoted at one end to said abutment, said links having their adjacent ends pivoted together and their pivotal connections to the valve and abutment separated by a distance substantially greater than the effective length of either link and in a line substantially parallel to the line of movement of the valve and a spring carried by and acting between said links adjacent their common pivotal connection tending to draw the links into alinement whereby the links act as a toggle tending to hold the valve to its seat.

4. In a safety valve construction, a valve proper, and pressure regulating means for resisting the opening of said valve, said means including an abutment and means for adjusting it, and a pair of links, one pivoted at one end to the valve and the other pivoted at one end to said abutment, said links having their adjacent ends pivoted together and their pivotal connections to the valve and abutment separated by a distance substantially greater than the effective length of either link and in a line substantially parallel to the line of movement of the valve and a spring carried by and acting between said links adjacent their common pivotal connection tending to draw the links into alinement whereby the links act as a toggle tending to hold the valve to its seat.

LOUIS SCHUTTE.

Witnesses:
SIMON W. SNYDER,
D. W. HILDRETH.